Feb. 16, 1954   F. T. HILLIKER   2,669,323
FOOD SERVICE SYSTEM AND MEANS THEREFOR
Filed Aug. 4, 1952   3 Sheets-Sheet 1
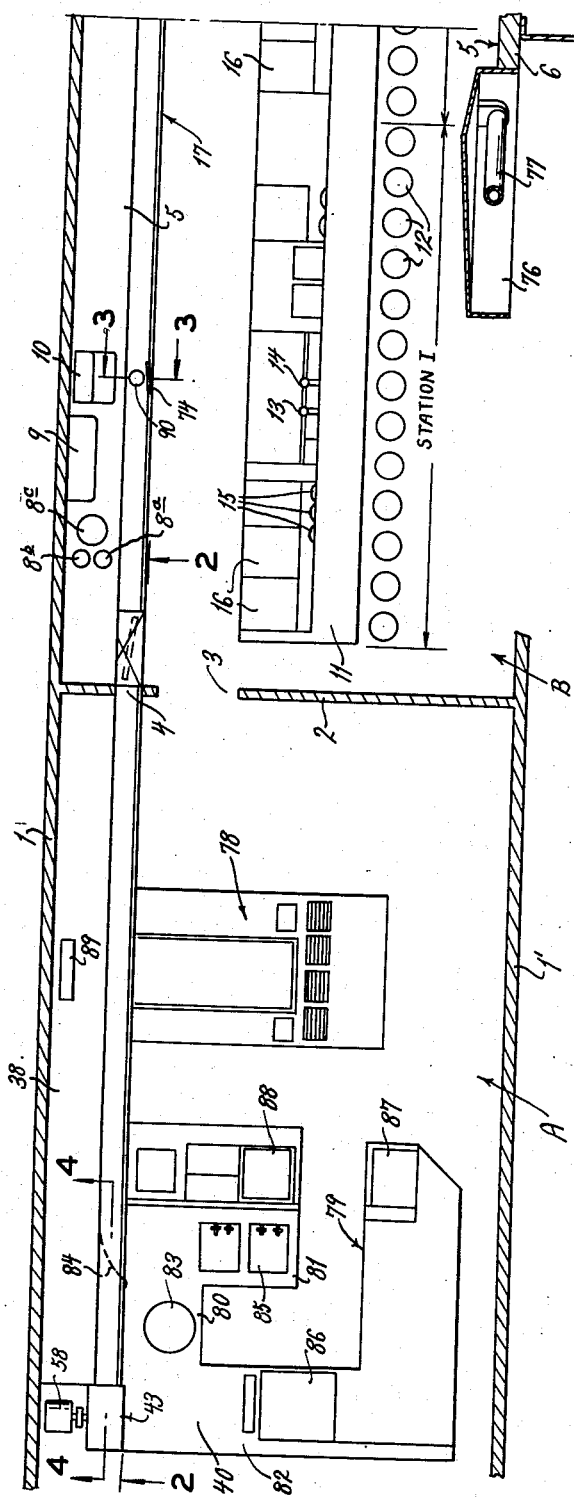
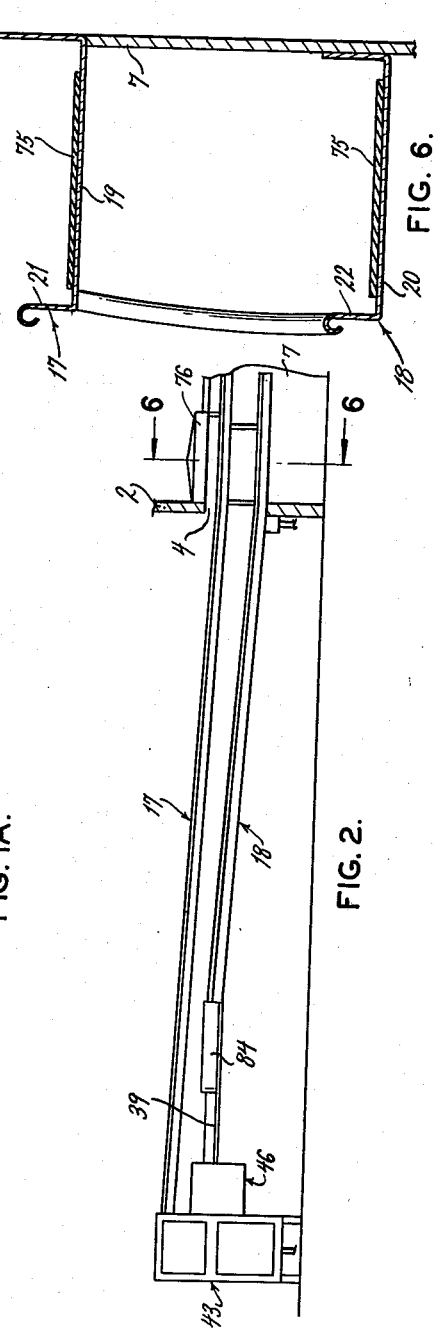
INVENTOR.
FRANK T. HILLIKER
BY
ATTORNEY Feb. 16, 1954  F. T. HILLIKER  2,669,323
FOOD SERVICE SYSTEM AND MEANS THEREFOR
Filed Aug. 4, 1952  3 Sheets-Sheet 2

INVENTOR.
FRANK T. HILLIKER
BY
ATTORNEY

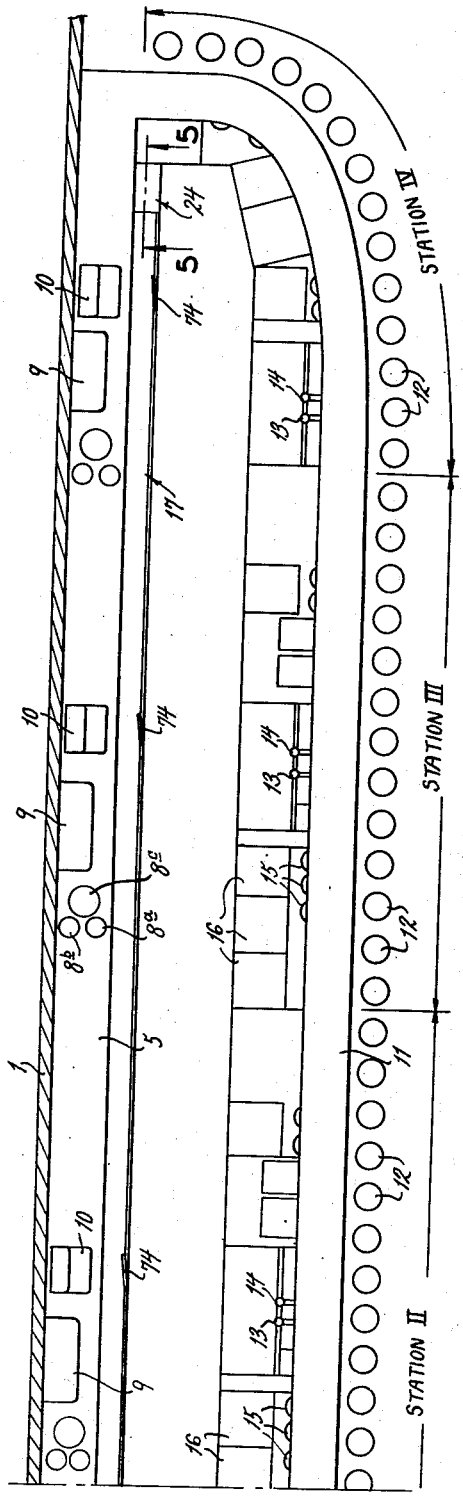

Patented Feb. 16, 1954

2,669,323

UNITED STATES PATENT OFFICE 2,669,323

FOOD SERVICE SYSTEM AND MEANS THEREFOR

Frank T. Hilliker, St. Louis, Mo., assignor to The Fountron Corporation, St. Louis, Mo., a corporation of Missouri Application August 4, 1952, Serial No. 302,595

3 Claims. (Cl. 186—1)

This invention relates in general to certain new and useful improvements in food service systems and means therefor.

At the present time, a great many restaurants seat the customers at tables and employ waitresses to take the orders and serve the food. This system is, of course, expensive and time-consuming. Consequently, the counter-service system has been widely adopted as being conducive to more efficient service of the customer at less overhead cost to the proprietor. Soda fountains and so-called lunch counters exemplify this latter type of system, but usually requires that all food and drinks be prepared by the counter attendants in the immediate vicinity of the customer being served. This practice rigidly limits the scope of the menu which can be served and, since the average soda-jerk is no chef, the quality of food-preparation and cleanliness ordinarily suffer. Occasionally a modified form of counter-service system is installed with a fairly complete and well staffed kitchen to permit service of better food from more complete and attractive menus. Thus far, however, such efforts have resulted in more inefficient and less profitable operation because the counter attendants must constantly travel between the food-preparation and customer-service areas just as much as in the classical sit-down type of restaurant with the serious further disadvantage of being confined in movement to the narrow area behind the counter. In addition, multiple-person tray service becomes virtually impossible, so that the counter-attendant is, for the most part, required to make at least one, and frequently several, trips for each customer carrying a small number of items on each trip. In fact, it is usually necessary to write up the order or "check," as it is called, and take it to the kitchen for preparation. After an interval, a second trip to the kitchen is required to pick up the order and serve it to the customer. Upon superficial consideration, it would seem that the counter-attendant could deposit a later written check while picking up an order previously turned in to the kitchen, but experience shows that such economies of time and motion cannot be effected. The rate of flow of incoming orders is ordinarily faster than the rate of flow of finished orders coming out of the kitchen, with the result that the customer is forced to wait for a substantial interval and the counter-attendant is required to do a tremendous amount of walking and carrying. Thus, in order to achieve any reasonable degree of profit-making turnover, it is necessary to employ a large number of counter-attendants in a kitchen-serviced establishment of any appreciable size. The overhead cost, however, in so doing is rather high and for that reason such systems have not been markedly successful or profitable.

It is, therefore, the primary object of the present invention to provide a food service system and means therefor in which the customers are seated along one or more elongated counters, which are subdivided into a series of stations each having identical equipment for servicing the customers with drinks and liquid food and all being operatively connected to a kitchen area at one end of the counter by a series of written-message transmitting devices and by a dual run conveyor belt extending substantially the entire length of the counter with means for stopping the various food orders at or adjacent to the station from which the order originated.

It is another object of the present invention to provide a food service system and means therefor which provides unusually close, fully mechanical liaison between the customer-service area and the kitchen area, so that a large number of customers can be served efficiently in a relatively short space of time, with the result that the rate of customer turn-over is extremely high for an installation of given size as compared with conventional installations of the same physical size and comparable cost.

It is a further object of the present invention to provide means for transporting food orders from the kitchen area to the customer-service area under unusually sanitary conditions wherein the food is covered until the moment it is served to the customer.

It is an additional object of the present invention to provide a food service system and means therefor necessitating a smaller number of employees in the customer-service area than is ordinarily required in conventional food service systems.

With the above and other objects in view, my invention resides in the novel features of form, construction, arrangement, and combination of parts presently described and pointed out in the claims.

In the accompanying drawing (3 sheets)—

Figure 1ᵃ and 1ᵇ together constitute a top plan view of a preferred form of food service system constructed in accordance with and embodying the present invention;

Figures 2, 3, and 4 are fragmentary transverse sectional views taken along lines 2—2, 3—3, and 4—4, respectively, of Figure 1a;

Figure 5 is a fragmentary transverse sectional view taken along line 5—5 of Figure 1b;

Figure 6 is a fragmentary transverse sectional view taken along line 6—6 of Figure 2;

Figure 3:
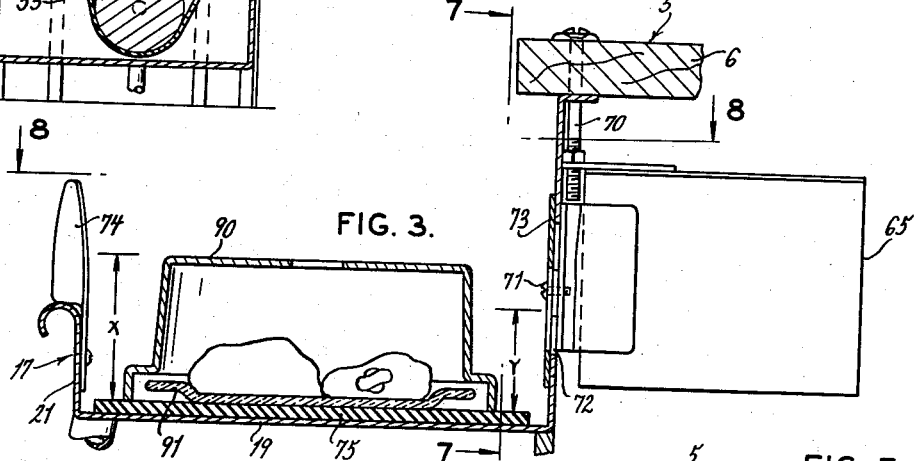
Figure 7:
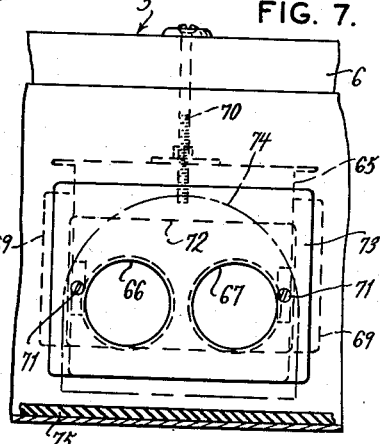
Figure 8:
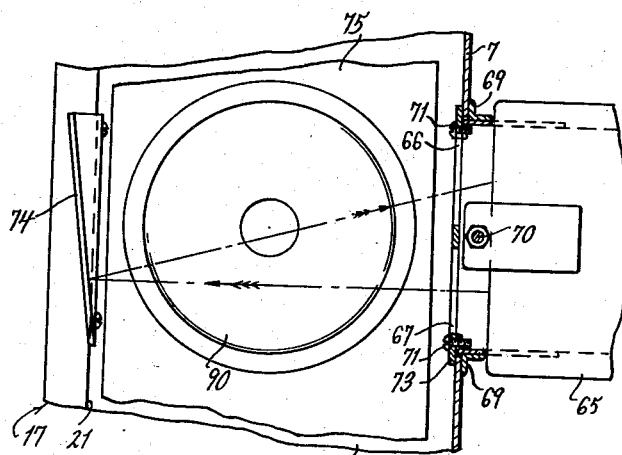

Figures 7 and 8 are fragmentary transverse sectional views taken along lines 7—7 and 8—8, respectively, of Figure 3; and Figures 9 and 10 are schematic wiring diagrams of the electrical connections forming a part of the present invention.

Referring now in more detail and by reference characters to the drawings, which illustrate a preferred embodiment of the present invention, A designates the kitchen area and B designates the customer-service area of an elongated restaurant or lunchroom having a continuous back wall 1. The kitchen area A and customer-service area B are preferably separated by a partition wall 2 having a doorway 3 and a belt-passage window or aperture 4. Although, as shown in the drawings, the food service system is adapted for installation within a long narrow room or store building having a second longitudinal side wall 1', it should be understood that this system can be installed in a larger store area, such as a retail department store sales floor or super-market, with the attendant elimination of the portion of the side wall 1' which extends across the customer-service area. Instead a railing or a series of counters could be employed to define the customer-service area or, for that matter, the area could be entirely open so as to be completely accessible from all points of the sales floor.

Mounted against, and extending longitudinally along, the back wall 1 substantially throughout the length of the customer-service area B is a back bar 5 consisting of a horizontal shelf-forming top member 6 and front apron 7 extending vertically from the under side of the top member 6 downwardly to the floor. The back bar 5 is, in effect, subdivided into four stations of equal length and each station is identically equipped with conventional dish storage wells 8a, 8b, 8c, an eye-level food display cabinet 9, and a telautograph sender 10. Mounted upon the back floor in outwardly spaced relation to the back bar 5 is a customer-service counter 11 extending substantially for the full length of the customer-service area, and at its forward end (reference being made to the right-hand end of Figure 1b) is curved inwardly toward the back bar 5. Along its front face, the counter 11 is provided with a series of uniformly spaced stools or seats 12 upon which the customers may seat themselves. The counter 11 is so arranged as to accommodate approximately eleven to fourteen stools for each station. The reverse or interior face of the counter 11 is lined with four duplicate soda fountain units consisting of dispensing faucets 13, 14, for ice water and carbonated water, respectively, a series of syrup-dispensing units 15, and a plurality of refrigerated ice-cream cabinets 16. The dish wells 8a, 8b, 8c, the display cabinets 9, the telautograph sender 10, the faucets 13, 14, the syrup-dispensing units 15, and the ice-cream cabinets 16 are all conventional components and, therefore, are not separately or individually described.

Mounted upon, and extending longitudinally along, the front apron 7 of the back bar 5 and extending downwardly from the top member 6 are two vertically spaced parallel conveyor troughs 17, 18, each having flat horizontal bottom walls 19, 20, and short upstanding front or curb-walls 21, 22, respectively. At their forward ends, the conveyor troughs 17, 18, are fixed to the side wall 23 of a rectilinear enclosed roller box 24, which is supported from the floor upon legs 25 and has a sump-forming bottom section 26 extending downwardly below the plane of the lower conveyor trough 18 and connected by means of a waste pipe 27 to a sewer connection (not shown). The side wall 23 is provided with elongated rectangular slots 28, 29, respectively located just above the bottom walls 19, 20, of the conveyor troughs 17, 18. The roller box 24 is interiorly provided with a pair of vertically spaced transversely extending idler rollers 30, 31, the upper roller 30 being tangential along its top surface to the plane of the bottom wall 19 and the lower roller 31 being similarly tangential along its bottom surface to the plane of the bottom wall 20 of the trough 18. Also mounted on the side wall 23 just above the opening or slot 28 and extending into the roller box 24 is a limit switch 32 having an exteriorly extending contact plunger 33 biased outwardly by means of a compression spring 34. Similarly mounted upon the side wall 23 over the opening or slot 29 is a spray pipe 35 conventionally connected by means of a pipe elbow 36 to a water pressure line 37. The spray pipe 35 is provided with a plurality of spray apertures for forming a thin curtain-like water spray which is directed outwardly and downwardly toward the bottom wall 20 of the conveyor trough 18.

The conveyor troughs 17, 18, extend rearwardly through the opening 4 in the partition wall 2 and across the kitchen area A along the front face of a back-counter 38. As the conveyor troughs 17, 18, pass through the aperture 4, they are deflected upwardly for a substantial distance, so that the lower conveyor trough 18 will gradually come up to table top height and is thus provided with a horizontal terminal portion 39 which is level with a dish scraping table 40. At its extreme rearward end, the conveyor trough 17 is rigidly secured along the lower margin of a horizontal slot or opening 41 formed in the side wall 42 of a roller box 43. Similarly, at its extreme rearward end, the conveyor trough 18 is rigidly secured along the lower margin of a horizontal slot or opening 44 formed in the side wall 45 of a scrubber-housing 46, which is, in turn, secured upon the wall 42 of the roller box 43 and opens thereinto through a slot 47. Interiorly the scrubber-housing 46 is provided with a removable catch-pan 48 and pairs of opposed flexible scraper blades 49, spray pipes 50, and wiper-brushes 51.

Operatively mounted within the roller box 43 are three idler rollers 52, 53, 54, and a main driving roller 55, the latter being connected by a belt 56 to the pulley 57 of a motor 58, which is supported from the floor by a frame 59 and is connected to a source of electric power through four photo-electric relays 60 which are in series with each other and the limit switch 32, as shown in Figure 9.

Each photo-electric relay 60 consists primarily of a photocell 61, an incandescent light source 62, a relay 63, and a grid-controlled electron tube 64 operatively mounted within a box-like housing 65 and electrically connected, as shown in Figure 10. Each of the housings 65 is provided with two circular apertures or windows 66, 67, respectively located in front of the photocell 61 and light source 62. Preferably, though not necessarily, an optical system 68 is interposed between the light source 62 and the opening 67 for concentrating the light into a focused beam which passes outwardly through the opening 67.

One photo-electric relay 60 is located at each station and is slidably mounted in vertical guides 69 upon the rear face of the apron 7 of the back bar 5 and is adjustably held in position by a vertical adjustment screw 70 extending through the top member 6 and also by locking screws 71 extending through the guides 69. It will, of course, be evident that the apron 7 is provided with apertures 72 opposite the windows 66, 67, and conventional escutcheon plates 73 for decoratively finishing the margins of the apertures 72.

Mounted upon the curb-wall 21 of the conveyor trough 17 opposite each aperture 72 is a polished planar reflector 74 angled in such a manner as to reflect the light beam from the light source 62 of the associated photo-electric relay 60 back into the photocell thereof.

Figure 4:
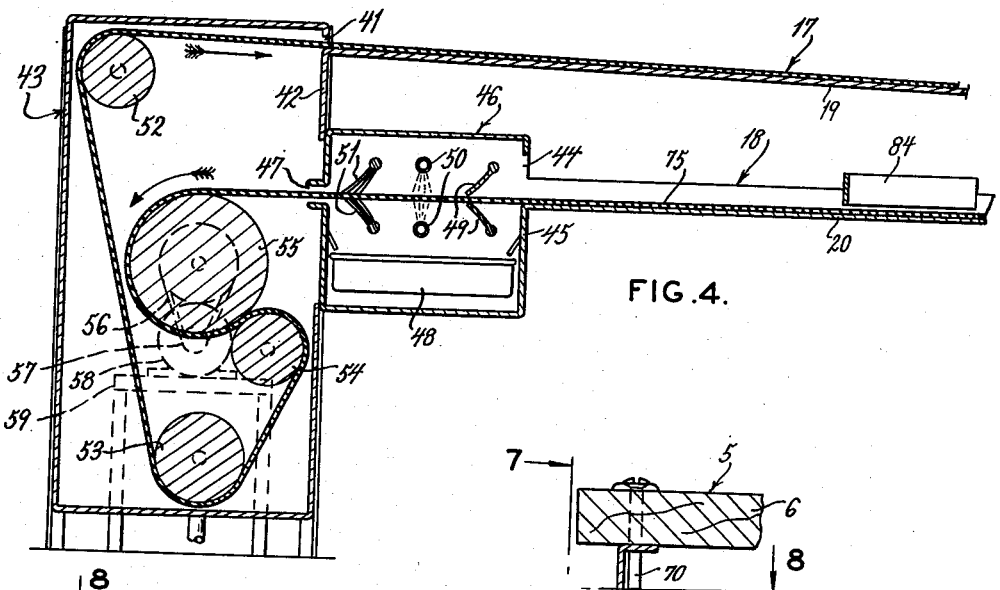

Extending slidably along the bottom walls 19, 20, of the conveyor troughs 17, 18, and around the rollers 30, 31, 52, 53, 54, 55, for movement in the direction shown by arrows in Figures 4 and 5 is a continuous conveyor belt 72, the lower run of which is trained between the scraper blades 49, the sprays 50, the wiper-brushes 51, and beneath the spray from the spray pipe 35. Mounted over the top run of the conveyor belt 75 just as it emerges from the opening 4 is a light-hood 76 having a downwardly directed ultra-violet sterilization lamp 77, the hood 76 being so arranged that the rays from the lamp 77 are at all times shielded from the eyes of the workers and customers.

Located adjacent to the conveyor belt 75 within the kitchen area A is a double-sided or duplicate-station food preparation table 78 conventionally equipped with toasters, ovens, sandwich grills, and similar cooking paraphernalia (not shown). Also located adjacent to the rear end of the conveyor belt 75 is the previously mentioned U-shaped dish-scraping table 40, which includes a central section 80 along the lower run of the conveyor 75 and spaced lateral sections 81, 82, extending outwardly from the opposite ends thereof. The central section 80 is provided with a conventional refuse-scraper 83 and the lower run of the conveyor belt 75, in this region, passes beneath an arcuately angled deflector-baffle 84, so that dishes being carried back to the kitchen area A will be automatically pushed off onto the central section 80 of the dish-scraping table 79. A glassware washing sink 85 is located in the lateral section 81 and a tunnel-type dishwasher 86 is located in the lateral section 82. The tableware, when washed and dry, is stored in suitable shelf-tiers 87, 88, directly accessible to the workers around the food preparation table 78. Also located in direct proximity to the food preparation table 78 is a telautograph receiver 89 connected to the several telautograph senders 10 in such a manner that it can receive messages from each of them.

Provided for co-operation with the conveyor belt 75 is a plurality of hollow plastic food-covers 90 adapted to fit peripherally over and around the food-laden plates 91 and ride directly upon the belt 75, as shown in Figure 3. Thus the food-covers 90 may be large enough to accommodate a dinner plate and then can also be used to cover plates of various smaller sizes, such as salad plates, dessert plates, and the like. The food-covers 90 are of four different height-dimensions $x$ and the system requires a supply of several hundred of each size. Furthermore, each size is made in a different color, i. e. clear, blue, red, and yellow. It will be obvious that the four different sizes correspond to the four stations and the vertical height of the photo relays 60 are set so that the cover 90 of lowest height will pass fully beneath the light beams of the first three photo-electric relays 60 in successive order from the opening 4 forwardly. The next higher cover 90 will interrupt the light beam of the third photo-electric relay 60, the next higher cover in successive order will interrupt the light beam of the second photo-electric relay 60, and, finally, the highest cover will interrupt the light beam of the first photo-electric relay 60. As will be observed by reference to Figures 9 and 10, interruption of any of the light beams from any one of the photo-electric relays 60 will cause the motor 58 and belt 75 to stop until the obstruction is removed.

In serving the customers, one counter-employee is assigned to each station and can place silverware, paper napkins, and ice water in front of each customer as the customer sits down. When the customer is ready to give his order, the counter-employee can write the order on a customer check and immediately thereafter copy the order on the telautograph sender 10. The order is thus electronically transmitted to the kitchen and is immediately made up. If this particular order was given at station II, for example, the food order when placed on the plate will be covered with a food-cover 90, the height-dimension $x$ of which is second in order of height. This cover may, for example, be of red color. Thus, as the plate is conveyed outwardly from the kitchen area A along the back bar 5, it will pass stations III and IV without stoppage. The counter-employee at station II, who is busy serving other customers, will, of course, occasionally turn around in the normal course of her duties, so that she can see the conveyor belt 75 and, because of its color, will be conscious that a food order intended for one of her customers is on its way. Consequently, she will be prepared to remove it from the conveyor belt almost immediately after it arrives at her station and, therefore, the belt 75 will be stopped only for an instant. If another customer meanwhile has seated himself at another station and the counter-employee at that station has taken his order, such order will also be transmitted to the kitchen by telautograph and the food order with its appropriate cover 90 will be placed on the conveyor belt 75 next in order. If this second customer has seated himself at station I, for example, and the covers for station I are blue in color, the counter-employee at station I will similarly be able to observe that a food order for her station is on its way also. When the first food order previously mentioned comes to rest at station II, the entire belt 75 will, of course, stop and all successive food orders will also remain stationary momentarily, but the minute this food order with the red cover is removed by the counter-employee at station II, the belt will resume its movement and the other orders will travel forward. It will be evident that the food orders will stop the belt upon arrival at their respective stations. This intermittent movement of the belt is entirely satisfactory because, in practice, the stoppage is only momentarily and the orders for any one station are not appreciably delayed by orders for any other station.

As soon as a customer has finished a meal, the dirty dishes can be removed from the counter 11 and placed on the lower or return run of the conveyor belt 75. It will be noted that the food coming out of the kitchen rides on one face of the belt 75 and the dirty dishes returning to the kitchen ride on the opposite face of the belt 75. Furthermore, the belt 75 is thoroughly cleansed as it passes through the scrubber-housing 46 and is sterilized as it passes beneath the sterilization lamp 77.

The dirty dishes, upon return to the kitchen area A, are automatically deflected by the deflector-baffle 84 from the conveyor belt 75 upon the dish-scraping table 79 and can be distributed by a single employee to the dish-washing tunnel 86 and glassware washing sink 85. The dish-washing and scraping phase of the operation can thus be handled efficiently by two employees. It has also been found desirable to employ one or two bus boys to carry various supplies to the several customer-service stations. The combination of visually differentiable colors for the food-covers 90 and the variations in height thereof, which cause the photo-electric relays 60 to operate, achieves an extremely efficient, rapid method of food delivery from the kitchen service area A, making it possible to serve an unusually large number of customers in a relatively short space of time. Furthermore, the elimination of the hurrying and scurrying of waitresses to and from the kitchen area, as encountered in conventional restaurants, creates an atmosphere of calm quietude which is conducive to the ease and comfort of the customer. As a result, the customer may enter the restaurant, be seated, give his order, be served, and depart in a surprisingly short space of time without ever feeling hurried or rushed.

It should be understood that changes and modifications in the form, construction, arrangement, and combination of the several parts of the food service system and means therefor may be made and substituted for those herein shown and described without departing from the nature and principle of my invention.

Having thus described my invention, what I claim and desire to secure by Letters Patent is:

1. A food service system for use in a restaurant-like establishment having a kitchen area and a customer-service area, said system comprising an elongated counter having a plurality of seats for accommodating customers, said counter and seats being arranged in a series of stations, a back bar mounted in rearwardly spaced parallel relation to the counter, a complete set of fountain-service equipment at each station, a continuous belt conveyor extending from the kitchen area outwardly into the customer-service area past each station for conveying plates of prepared food to the stations, drive means for driving said belt conveyor, a light source at each station for directing a beam of light across said conveyor in upwardly spaced relation thereto, the beam at any given station passed by the conveyor as it moves from the kitchen area being spaced from the conveyor a smaller distance than any beam already passed by the conveyor and a greater distance than any succeeding beam, an electric eye at each station in position to receive the light beam at such station and being connected with said drive means to stop said conveyor when the light beam does not fall on the electric eye, and plate covers of different heights adapted to overlie the plates of food advanced by said conveyor, the height of a cover placed over a plate of food intended for a given station being such that the light beam at the given station will be broken by the cover upon the arrival of the cover at the given station and being such that the cover will pass under any light beam preceding the light beam at the given station in the direction of advance of the conveyor.

2. A food service system for use in a restaurant-like establishment having a kitchen area and a customer-service area, said system comprising an elongated counter having a plurality of seats for accommodating customers, said counter and seats being arranged in a series of stations, a back bar mounted in rearwardly spaced parallel relation to the counter, electric means for transmitting food orders from each station to the kitchen area, a complete set of fountain-service equipment at each station, a continuous belt conveyor extending from the kitchen area outwardly into the customer-service area past each station for conveying plates of prepared food to the stations, drive means for driving said belt conveyor, a light source at each station for directing a beam of light across said conveyor in upwardly spaced relation thereto, the beam at any given station passed by the conveyor as it moves from the kitchen area being spaced from the conveyor a smaller distance than any beam already passed by the conveyor and a greater distance than any succeeding beam, an electric eye at each station in position to receive the light beam at such station and being connected with said drive means to stop said conveyor when the light beam does not fall on the electric eye, and plate covers of different heights adapted to overlie the plates of food advanced by said conveyor, the height of a cover placed over a plate of food intended for a given station being such that the light beam at the given station will be broken by the cover upon the arrival of the cover at the given station and being such that the cover will pass under any light beam preceding the light beam at the given station in the direction of advance of the conveyor.

3. A food service system for use in a restaurant-like establishment having a kitchen area and a customer-service area, said system comprising an elongated counter having a plurality of seats for accommodating customers, said counter and seats being arranged in a series of stations, a back bar mounted in rearwardly spaced parallel relation to the counter, a complete set of fountain-service equipment at each station, a dish-scraping table located in the kitchen area having a waist-height working surface, a continuous belt conveyor extending from the kitchen area outwardly into the customer-service area past each station, said belt conveyor having an upper outwardly traveling horizontal run extending slightly below the top of the back bar for conveying plates of prepared food to the stations and a lower return run for carrying the used dishes back to the kitchen area, said return run being inclined angularly upwardly and rearwardly after it enters the kitchen area until it reaches a height substantially level with the working surface of the dish-scraping table, an angularly disposed deflector baffle located across the lower run of the belt conveyor in the region of the dish-scraping table for sliding the dishes off the belt conveyor and onto the dish-scraping table, drive means for driving said belt conveyor, a light source at each station for directing a beam of light across said conveyor in upwardly spaced relation thereto, the beam at any given station passed by the conveyor as it moves from the kitchen area being spaced from the conveyor a smaller distance than any beam already passed by the conveyor and a greater distance than any succeeding beam, an electric eye at each station in position to receive the light beam at such station and being connected with said drive means to stop said conveyor when the light beam does not fall on the electric eye, and plate covers of different heights adapted to overlie the plates of food advanced by said conveyor, the height of a cover placed over a plate of food intended for a given station being such that the light beam at the given station will be broken by the cover upon the arrival of the cover at the given station and being such that the cover will pass under any light beam preceding the light beam at the given station in the direction of advance of the conveyor.

FRANK T. HILLIKER.

References Cited in the file of this patent

UNITED STATES PATENTS

| Number | Name | Date |
| --- | --- | --- |
| 659,057 | Doyle | Oct. 2, 1900 |
| 1,147,831 | Vary et al. | July 27, 1915 |
| 1,360,657 | McGlaughlin | Nov. 30, 1920 |
| 1,705,112 | Hall | Mar. 12, 1929 |
| 1,722,342 | St. John | July 30, 1929 |
| 1,865,596 | Starks | July 5, 1932 |
| 1,881,898 | Olson | Oct. 11, 1932 |
| 1,937,303 | Worrall | Nov. 28, 1933 |
| 2,405,294 | Delucchi | Aug. 6, 1946 |
| 2,508,086 | Alverez | May 16, 1950 |